United States Patent
Argue et al.

(10) Patent No.: US 10,140,617 B2
(45) Date of Patent: Nov. 27, 2018

(54) WARRANTY STORING AND PRESENTING APPARATUS AND METHOD

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 439 days.

(21) Appl. No.: 13/730,336

(22) Filed: Dec. 28, 2012

(65) Prior Publication Data
US 2014/0188641 A1  Jul. 3, 2014

(51) Int. Cl.
  *G06Q 30/00*  (2012.01)
(52) U.S. Cl.
  CPC ................. *G06Q 30/012* (2013.01)
(58) Field of Classification Search
  CPC .......... G06Q 30/0231; G06Q 30/012
  USPC ..................................................... 705/28, 30
  See application file for complete search history.

(56) References Cited

U.S. PATENT DOCUMENTS

| | | | |
|---|---|---|---|
| 6,208,853 B1 | 3/2001 | LoVasco | |
| 6,934,686 B1 * | 8/2005 | Rajagopalan | ................. 705/1.1 |
| 8,229,861 B1 | 7/2012 | Trandal | |
| 8,296,229 B1 | 10/2012 | Yellin | |
| 8,387,858 B2 * | 3/2013 | Bohn | ..................... G06Q 30/02 235/375 |
| 8,468,064 B1 * | 6/2013 | Trandal | ................. G06Q 30/02 705/26.7 |
| 2001/0051884 A1 | 12/2001 | Wallis | |
| 2002/0188559 A1 | 12/2002 | Schultz | |
| 2004/0046033 A1 | 3/2004 | Kolodziej | |
| 2005/0015273 A1 | 1/2005 | Iyer | |
| 2006/0095289 A1 | 5/2006 | Bunning | |
| 2006/0175401 A1 * | 8/2006 | Roberts | ............... G06Q 10/087 235/383 |
| 2007/0045405 A1 * | 3/2007 | Rothschild | ............. G06Q 20/20 235/380 |
| 2007/0180468 A1 * | 8/2007 | Gill et al. | ...................... 725/45 |

(Continued)

FOREIGN PATENT DOCUMENTS

| | | | | |
|---|---|---|---|---|
| EP | 1195706 A2 * | 4/2002 | ........ | G06Q 20/0453 |
| JP | 2003123144 A * | 4/2003 | | |
| WO | WO2013100889 A1 | 7/2013 | | |

*Primary Examiner* — Florian M Zeender
*Assistant Examiner* — Milena Racic
(74) *Attorney, Agent, or Firm* — Bryan Cave Leighton Paisner LLP (57) ABSTRACT

A computer-implemented method is disclosed for storing and presenting warranties to one or more customers. Within the method, a computer system may store at least one warranty. Subsequently, a point-of-sale system forming part of the computer system may initiate a point-of-sale transaction involving a customer. The computer system may then determine that a first product forming part of the point-of-sale transaction corresponds to a first warranty of the least one warranty and offer to display the first warranty. In response to the offer, the computer system may receive a request to display the first warranty from a computing device corresponding to the customer. Accordingly, the computer system may present the first warranty to the customer via the computing device.

20 Claims, 7 Drawing Sheets

(56) References Cited

U.S. PATENT DOCUMENTS

| | | | |
|---|---|---|---|
| 2010/0088174 A1* | 4/2010 | Cohagan | G06Q 30/02 |
| | | | 705/14.33 |
| 2010/0100489 A1 | 4/2010 | Chase | |
| 2010/0185503 A1* | 7/2010 | Drew | G06Q 30/00 |
| | | | 705/14.11 |
| 2010/0299217 A1* | 11/2010 | Hui | 705/23 |
| 2011/0131135 A1 | 6/2011 | Carlson | |
| 2011/0145148 A1* | 6/2011 | Hammad | G06Q 20/042 |
| | | | 705/44 |
| 2011/0197120 A1* | 8/2011 | Arst | B42F 21/06 |
| | | | 715/230 |
| 2012/0011072 A1 | 1/2012 | Lodolo | |
| 2012/0084135 A1* | 4/2012 | Nissan | G06Q 30/06 |
| | | | 705/14.38 |
| 2012/0109693 A1* | 5/2012 | Smith | G06Q 20/204 |
| | | | 705/4 |
| 2012/0160911 A1 | 6/2012 | Smith | |
| 2012/0166298 A1 | 6/2012 | Smith | |
| 2012/0239477 A1* | 9/2012 | Cueli | G06Q 20/027 |
| | | | 705/14.23 |
| 2012/0290422 A1 | 11/2012 | Bhinder | |
| 2013/0097034 A1 | 4/2013 | Royyuru | |
| 2013/0191213 A1* | 7/2013 | Beck | G06O 30/0267 |
| | | | 705/14.53 |
| 2014/0074675 A1* | 3/2014 | Calman | G06Q 20/0453 |
| | | | 705/35 |

* cited by examiner

WARRANTY STORING AND PRESENTING APPARATUS AND METHOD

BACKGROUND

Field of the Invention

This invention relates to point-of-sale systems and more particularly to systems and methods for using receipt data as an interface through which warranty information may be offered and obtained.

Background of the Invention

Many point-of-sale (POS) systems currently in use today do not support important emerging technologies, services, and marketing opportunities. For example, many POS systems are limited in their ability to collect, analyze, and use electronic receipt data. As a result, those POS systems cannot effectively implement many novel methods and services surrounding such data. Accordingly, what is needed is an apparatus and method expanding the ability of a wide variety of POS systems and supporting computer systems, include legacy POS systems, to use electronic receipt data to benefit customers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
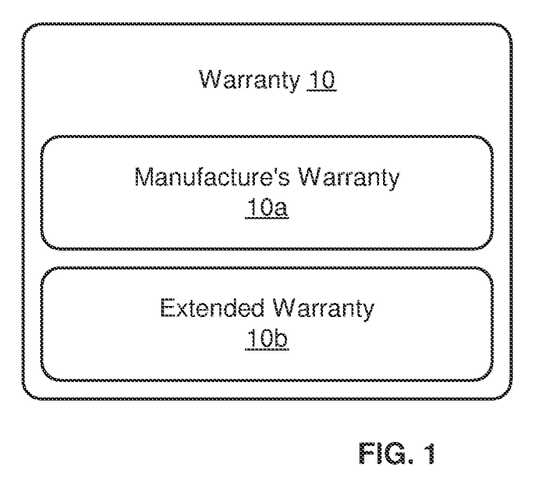
FIG. 1 is a schematic diagram illustrating various types of warranties in accordance with the present invention.

Referring to FIG. 1, a warranty 10 may be defined as an assurance or promise made by one entity (e.g., person, group, business, or the like) to another that one or more facts or conditions are true or will be met. Accordingly, the entity to which a warranty 10 is issued may rely on that assurance or promise and seek some type of remedy if the one or more facts or conditions are not true or not met.

Businesses, retailers, and the like often use warranties 10 to set forth specific facts or conditions relating to the manufacture, sale, or use of certain goods or services. In selected embodiments, warranties 10 may have a significant effect on commerce. Warranties 10 are important to customers. A favorable warranty 10 may be an important factor in a customer's decision to purchase a particular good or service. For example, a favorably warranty 10 may give a customer the confidence necessary to purchase a new product (e.g., a product that has no established market history).

Warranties 10 may come in various forms or types. One form or type of warranty 10 may be referred to as a manufacturer's warranty 10a. A manufacturer's warranty 10a may define the assurances or promises made by a manufacturer with respect to a product manufactured thereby. For example, a manufacturer's warranty 10 may warrant that, at a time of sale, a particular product will be free from any manufacturing defects (e.g., defects that would prevent the product from performing its intended purpose or purposes). In selected situations, a manufacturer's warranty 10a may cover a selected period of time. For example, a manufacturer's warranty 10 may warrant that for one year after an initial sale a particular product will be free from any manufacturing defects.

Another form or type of warranty 10 may be referred to as an extended warranty 10b. An extended warranty 10b may be an add-on marketed or sold by a manufacturer, an entity related to the manufacturer, or an entity completely independent of the manufacturer. As the name suggests, an extended warranty 10b may, in selected situations, extend in some manner beyond a manufacturer's warranty 10a. For example, a manufacturer's warranty 10a corresponding to a particular appliance may extend for one year. An extended warranty 10b may be purchased (e.g., from an entity independent of the manufacturer) to extend the warrantied period to four years.

In certain situations, an extended warranty 10b may state in writing that during any period covered by a manufacturer's warranty 10a, the consumer must deal with the manufacturer regarding any defect, malfunction, or the like. Thus, in those situations, an extended warranty 10b may only be active or in force after a manufacturer's warranty 10a has expired.

Figure 2:
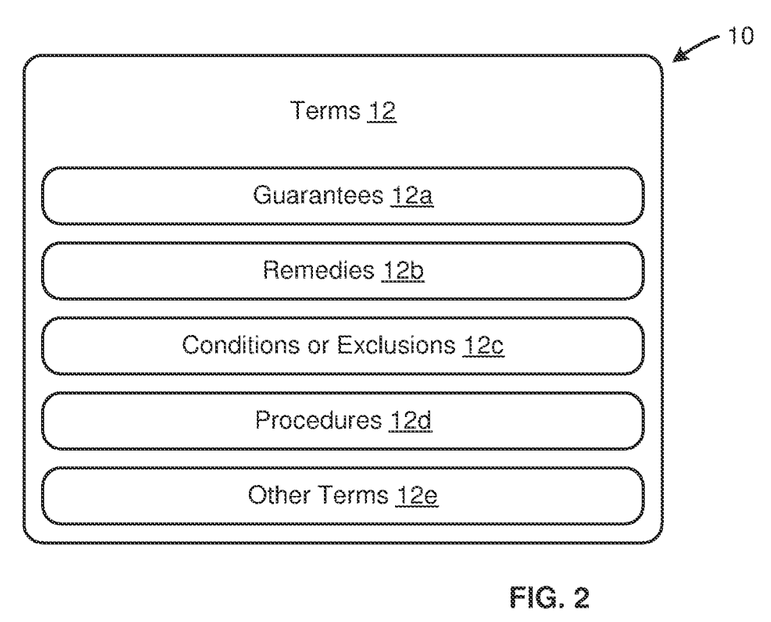
FIG. 2 is a schematic diagram illustrating one embodiment of the various terms that may constitute a warranty in accordance with the present invention.

Referring to FIG. 2, a warranty 10 in accordance with the present invention may have any suitable form, layout, content, or the like. In selected embodiments, a warranty 10 may include a written recitation of one or more terms 12 that define the "metes and bounds" of the warranty 10. For example, a warranty 10 may include one or more guarantees 12a, remedies 12b, conditions or exclusions 12c, procedures 12d, some other terms 12e, or the like or a combination or sub-combination thereof.

A guarantee 12a may form a core of a warranty 10. For example, a manufacturer's warranty 10a may include a guarantee 12a that one or more products sold under the warranty 10a will be free of manufacturing defects for a certain period of time. A remedy 12b may explain what the customer may receive in compensation should a guarantee 12a fail. For example, a remedy 12b may state that a defective product may be returned to the manufacturer for replacement, a refund, or the like.

Conditions or exclusions 12c may define what actions may void a warranty 10. For example, an exclusion 12c may expressly void a warranty 10 if a customer tampers with the products (e.g., opens certain sealed components or the like). Procedures 12d may define how a customer, manufacture, or the like should or will act or proceed. For example, a procedure 12d may specify that a defective product must be shipped to a particular address in order to properly initiate a refund or replacement process.

To be useful, a warranty 10 must be recorded in some medium. Only when is it recorded and accessible can the specific terms 12 of a warranty 10 be analyzed and followed or utilized. Accordingly, in selected embodiments, systems and methods in accordance with the present invention may facilitate the storing and presenting of warranty information (e.g., written recitations of the terms 12 of a warranty 10) in some useful format (e.g., as text, images, or the like). In certain embodiments, systems and methods in accordance with the present invention may use receipt data as an interface or vehicle through which warranty information may be offered and/or obtained.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
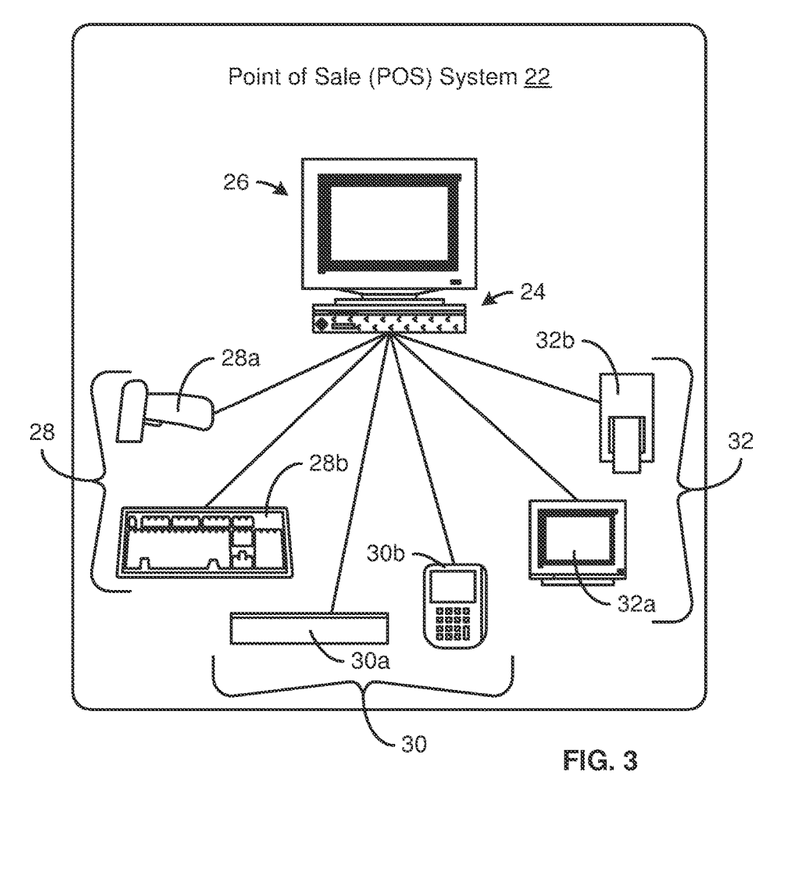
FIG. 3 is a schematic block diagram of one embodiment of a point-of-sale (POS) system for implement methods in accordance with the present invention.

Referring to FIG. 3, in selected embodiments, the hardware, software, or hardware and software of a POS system 22 may be configured to implement or support one or more methods in accordance with the present invention. A POS system 22 in accordance with the present invention may include various components. In certain embodiments, a POS system 22 may include a central or primary computer 24, a monitor 26 (e.g., a cashier-facing monitor 26), one or more input devices 28 (e.g., scanners 28a, keyboards 28b, scales, or the like), one or more payment devices 30 (e.g., cash drawers 30a, card readers 30b) for receiving or returning payments, one or more output devices 32 (e.g., customer-facing display 32a or monitor 32a, receipt printer 32b), or the like or combinations or sub-combinations thereof.

A computer 24 may form the primary processing unit of a POS system 22. Other components 28, 30, 32 forming part of a POS system 22 may communicate with the computer 24. Input devices 28 and certain payment devices 30 may feed data and commands to a computer 24 for processing or implementation. For example, a scanner 28a may pass data communicating the identity of one or more items to be purchased, returned, or the like to a computer 24. Similarly, a card reader 30b may pass payment information to a computer 24.

Conversely, output devices 32 and certain payment devices 30 may follow or implement commands issued by a computer 24. For example, a cash drawer 30a may open in accordance with the commands of a computer 24. Similarly, a customer-facing display 32a and receipt printer 32b may display or output data or information as instructed by a computer 24.

In selected embodiments, in addition to handling consumer transactions (e.g., purchases, returns), a POS system 22 may also provide or support certain "back office" functionality. For example, a POS system 22 may provide or support inventory control, purchasing, receiving and transferring products, or the like. A POS system 22 may also store sales and customer information for reporting purposes, marketing purposes, receivables management, trend analysis, cost analysis, price analysis, profit analysis, or the like. If desired or necessary, a POS system 22 in accordance with the present invention may include an accounting interface to pass certain information to one or more in-house or independent accounting applications.

Figure 4:
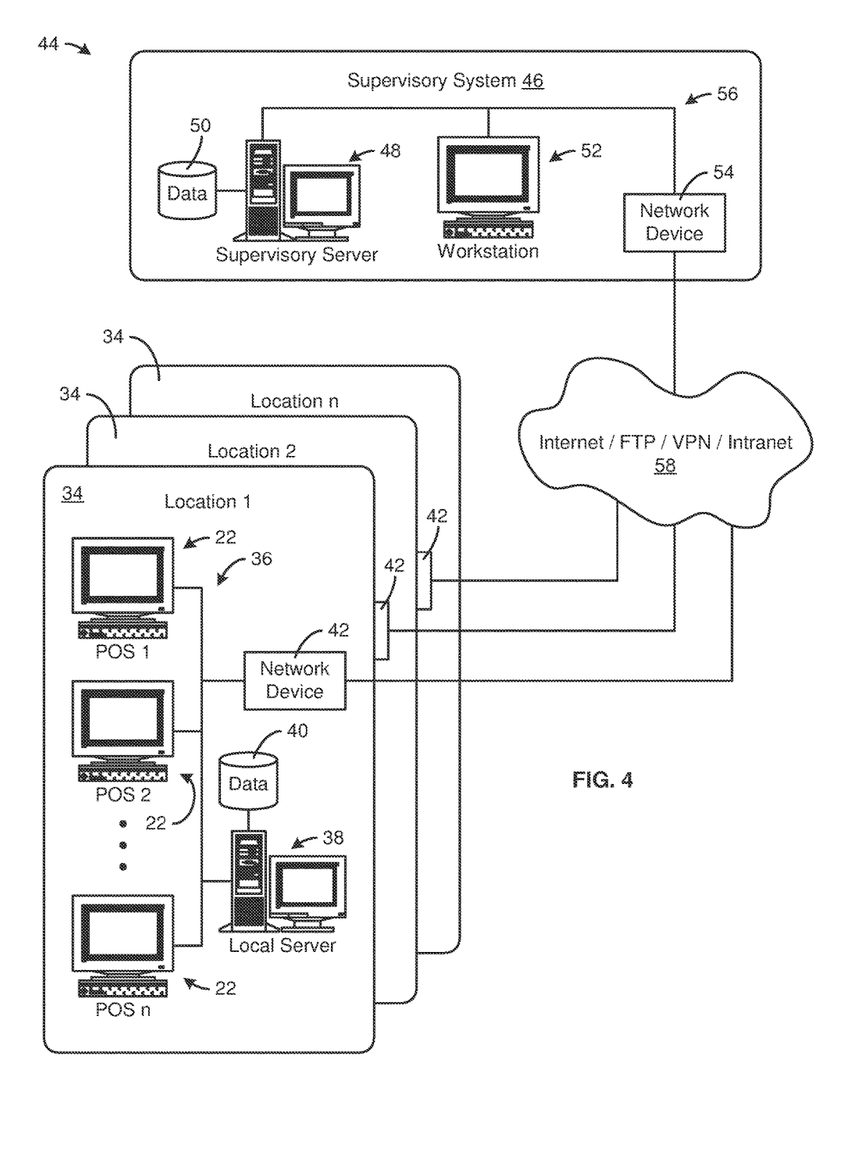
FIG. 4 is a schematic block diagram of one embodiment of multiple POS systems in accordance with the present invention operating in the context of an enterprise-wide system.

Referring to FIG. 4, in selected embodiments, a POS system 22 may operate substantially independently, as a stand-alone unit. Alternately, a POS system 22 in accordance with the present invention may be one of several POS systems 22 forming the front line of a larger system. For example, multiple POS systems 22 may operate at a particular location 34 (e.g., within a retail, brick-and-mortar store). In such embodiments, the various POS systems 22 may be interconnected via a LAN 36. A LAN 36 may also connect the POS systems 22 to a local server 38.

A local server 38 may support the operation of the associated POS systems 22. For example, a server 38 may provide a central repository from which certain data needed by the associated POS systems 22 may be stored, indexed, accessed, or the like. A server 38 may serve certain software to one or more POS systems 22. In certain embodiments, a POS system 22 may offload certain tasks, computations, verifications, or the like to a server 38.

Alternatively, or in addition thereto, a server 38 may support certain back office functionality. For example, a server 38 may receive and compile (e.g., within one or more associated databases 40) data from the various associated POS systems 22 to provide or support inventory control, purchasing, receiving and transferring products, or the like. A server 38 may also receive and compile sales and customer information for reporting purposes, marketing purposes, receivables management, trend analysis, cost analysis, price analysis, profit analysis, or the like.

In certain embodiments, one or more POS systems 22 or servers 38 corresponding to a particular location 34 may communicate with or access one or more remote computers or resources via one or more network devices 42. For example, a network device 42 may enable a POS system 22 to contact outside resources and verify the payment credentials (e.g., credit card information) provided by a customer. A network device 42 may comprise a modem, router, or the like.

In selected embodiments, a POS system 22 in accordance with the present invention may operate within an enterprise-wide system 44 comprising multiple locations 34 (e.g., branches 34 or stores 34). In such embodiments, each location 34 may have one or more POS systems 22, local servers 38, local databases 40, network devices 42, or the like or combinations or sub-combinations thereof connected by a computer network (e.g., a LAN 36). Additionally, each such location 34 may be configured to interact with one or more supervisory systems 46. For example, multiple branch locations 34 may report to an associated "headquarters" location or system.

A supervisory system 46 may comprise one or more supervisory servers 48, databases 50, workstations 52, network devices 54, or the like or combinations or sub-combinations thereof. The various components of a supervisory system 46 may be interconnected via a computer network (e.g., a LAN 56). In selected embodiments, a supervisory system 46 may comprise one or more supervisory servers 48 providing a central repository from which certain data needed by the one or more POS systems 22 or local servers 38 may be stored, indexed, accessed, or the like.

Alternatively, or in addition thereto, a supervisory server 48 may receive and compile (e.g., within one or more associated databases 50) data from the various associated POS systems 22 or local servers 38 to provide or support inventory control, purchasing, receiving and transferring products, or the like. A supervisory server 48 may also receive and compile sales and customer information for reporting purposes, marketing purposes, receivables management, trend analysis, cost analysis, price analysis, profit analysis, or the like.

A supervisory system 46 may be connected to one or more associated locations 34 or branches 34 in via any suitable computer network 58 (e.g., WAN 58). For example, in selected embodiments, one or more locations 34 may connect to a supervisor system 46 via the Internet. Communication over such a network 58 may follow any suitable protocol or security scheme. For example, communication may utilize the File Transfer Protocol (FTP), a virtual private network (VPN), intranet, or the like.

Figure 5:
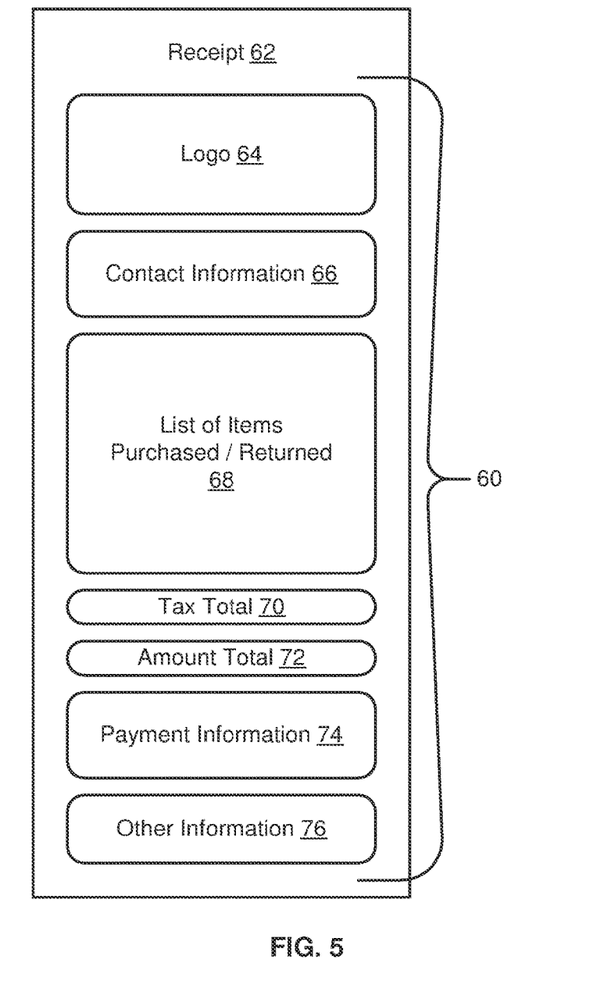
FIG. 5 is a schematic block diagram of one embodiment of a receipt in accordance with the present invention.

Referring to FIG. 5, a POS system 22 may collect and/or generate receipt data 60. Receipt data 60 may document a transaction (e.g., sale or return) carried out by a POS system 22. Receipt data 60 may be presented or displayed to a customer in the form of receipt 62 (e.g., a hardcopy receipt, "paperless" electronic receipt, or the like or a combination thereof). In selected embodiments, receipt data 60 may be delivered electronically to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 22, local servers 38, supervisory servers 48, some other onsite resources, one or more applications running on a customer's computing device, some other offsite resources, or the like or combinations or sub-combinations thereof, hereinafter a "computer system").

In selected embodiments, receipt data 60 and a receipt 62 may include a logo 64, contact information 66, a list 68 of items purchased or returned, a total 70 indicating the sales tax assessed or returned, a total 72 indicating the amount paid or returned, payment information 74, other information 76, or the like or combinations or sub-combinations thereof.

A logo 64 may reinforce the brand and image of the associated entity within the mind of a consumer. By including contact information 66 on a receipt 62, an entity may ensure that a customer has ready access to one or more physical addresses, Internet address, telephone numbers, facsimile numbers, hours of operation, or the like or combinations or sub-combinations thereof. One or more of a list 68 of items purchased or returned, a total 70 indicating the sales tax assessed or returned, a total 72 indicating the amount paid or returned, and payment information 74 (e.g., date of transaction, an indication of method of payment, an indication of which credit or debit card was used, etc.) may be included to document important details of a transaction.

Other information 76 may be included within a receipt 62 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

In selected embodiments, other information 76 contained within receipt data 60 may include information (e.g., meta data or the like) that is not directly displayed to a customer. In certain embodiments, such non-displayed information may relate to one or more warranties 10. For example, receipt data 60 may include one or more flags indicating the availability of one or more warranties 10 for one or more products identified within the receipt data 60 (e.g., for one or more goods or services identified as purchased within the receipt data 60).

In certain embodiments, each product identified within receipt data 60 may have, within the receipt data 60, at least two flags corresponding thereto. A first flag may, when set, indicate the availability (e.g., identified and stored nature) of a manufacturer's warranty 10a for the corresponding product. A second flag may, when set, indicate the availability (e.g., identified, stored, and purchased nature) of an extended warranty 10b for a corresponding product. In selected embodiments, an extended warranty 10b may be listed within receipt data 60 as one of the products purchased.

A receipt 62 passed to a computing device of a customer in electronic format may be presented by the computing device in any suitable layout or format. For example, the receipt data 60 forming a receipt 62 may simply be presented as a textual list. Alternatively, an electronic version of the receipt 62 may follow the form of a paper receipt. That is, a receipt 62 in an electronic format may comprise a virtual representation or layout substantially matching what a comparable paper receipt would look like.

The manner in which a receipt 62 in an electronic format is presented or displayed on a computing device of a customer may be completely dictated by the computer system delivering the receipt data 60 thereto. Alternatively, the computing device of the customer may have an application (e.g., a receipt manager, accounting program, budgeting program, or the like) installed thereon. Such an application may partially or completely control the layout or format of receipt data 60 displayed therewith or therethrough. For example, a computer system may supply receipt data 60, while the application installed on the computing device of the customer supplies the layout or formatting.

In selected embodiments, the manner in which receipt data 60 is displayed to a customer (or the options made available to a customer with respect to the receipt data 60) may be based at least in part on how one or more flags are set within the receipt data 60. For example, in certain embodiments, when a manufacturer's warranty 10a flag is set for a particular product, an application running on a customer's computing device may create and/or present an offer (e.g., a "see warranty" button) to display the manufacturer's warranty 10a to the customer. Similarly, when an extended warranty 10b flag is set for a particular product, an application running on a customer's computing device may create and/or present an offer to display the extended warranty 10b to the customer.

Such buttons or offers to display one or more warranties 10 may be presented to a customer in any suitable manner. In selected embodiments, one or more button or offers may be superimposed over an image of a receipt 62 (e.g., over a virtual representation or layout that substantially matches a comparable paper receipt) as it is displayed on a computing device of a corresponding customer. Alternatively, one or more buttons or offerings may be presented or displayed in other views (e.g., an itemized view of a receipt data 60), pages, menus, or the like that may be reached or accessed via the application, computing device, or the like.

In selected embodiments or situations, certain information regarding a warranty 10 may be known in real time as a point-of-sale transaction (e.g., purchase) is being conducted or completed. For example, upon scanning a product to be purchased, a computer system may readily and substantially immediately determine whether a manufacturer's warranty 10a corresponding to the product is stored within the computer system. Accordingly, appropriate flags may be set in receipt data 62 before it is ever delivered to a corresponding computing device.

In other embodiments or situations, certain information regarding a warranty 10 may not be known in real time as a point-of-sale transaction is being conducted or completed. For example, upon scanning a product to be purchased, a computer system may not be able to readily and substantially immediately determine whether an extended warranty 10b corresponding to the product has been or will be purchased. Accordingly, appropriate flags may be set in one or more updates delivered to a computing device some time after the corresponding receipt data 62 was originally delivered to the computing device.

Figure 6:
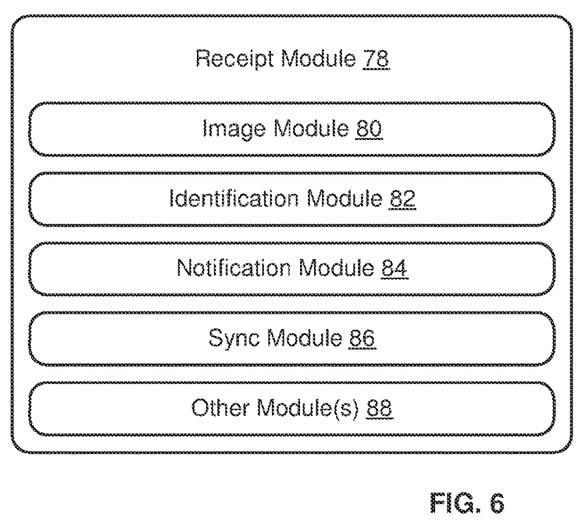
FIG. 6 is a schematic block diagram of one embodiment of a receipt module in accordance with the present invention.

Referring to FIG. 6, a computer system in accordance with the present invention may deliver receipt data 60 to a printer 32b or to a computing device of a customer in any suitable manner. In selected embodiments, a receipt module 78 may enable or support such delivery. A receipt module 78 may include any suitable arrangement of sub-components or modules. In certain embodiments, a receipt module 78 may include an image module 80, identification module 82, notification module 84, synchronization module 86, one or more other modules 88 as desired or necessary, or the like or some combination or sub-combination thereof.

An image module 80 may assemble, generate, or obtain an advertisement comprising a call to action. A call to action may invite or motivate a customer to take a particular step or action. For example, a call to action may invite or motive a consumer to download receipt data 60. Alternatively, a call to action may invite or motive a customer to obtain an electronic receipt application, participate in an electronic receipt program, or the like.

To increase the likelihood that a consumer will respond favorably to the call to action, an advertisement may include an enabler facilitating the desired step or action. For example, in selected embodiments, an advertisement may include a machine-readable code. By scanning the code (e.g., scanning the code using a camera on a mobile telephone, tablet computer, or the like), a consumer may import receipt data 60 encoded within the code. Alternatively, scanning the code may initiate the download of receipt data 60, the download of an application for receiving and/or displaying receipt data 60, enrollment in an electronic receipt program, or the like or a combination or subcombination thereof.

For example, a machine-readable code may be encoded with a URL. In addition to designating a particular resource, a URL may also include a transaction identification (ID). Accordingly, after an appropriate application is launched and a machine-readable code is scanned, a URL may be passed from a customer (e.g., from a mobile telephone of a customer) to an Internet Service Provider (e.g., a telecommunications provider). As a result, an appropriate resource within a computer system may be accessed and receipt data may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 82 may be tasked with requesting, collecting, and/or communicating identification information linking a customer associated with a transaction with one or more records stored within a computer system. For example, as part of a transaction carried out at a POS system 22, an identification module 82 may request, collect, and/or communicate identification information linking a transaction to a particular computing device or account corresponding to the customer participating in the transaction. Thus, information corresponding to the transaction may be passed to the customer via the particular computing device or account.

An identification module 82 may request, collect, and/or communicate one or more types of identification information. For example, in selected embodiments, an identification module 82 may collect a unique identification or membership number from a customer. This may be done when a membership card, club card, loyalty card, identification card, credit card, debit card, fingerprint or other biometric characteristic, or the like is scanned, input, or otherwise collected at a POS system 22. In other situations, a cashier or customer may type in a unique identification number, payment number, membership number, or the like at a POS system 22. For example, while a cashier is processing a transaction, a customer may be prompted via a card reader 30*b*, customer-facing display 32*a*, or the like to enter (e.g., type in using the card reader 30*b*) a mobile telephone number corresponding to the customer. Alternatively, a cashier may type in a telephone number corresponding to the customer.

Once the identification information is received, it may be used directly (e.g., used directly to pass receipt data 60 to a computing device of a corresponding customer). Alternatively, or in addition thereto, the identification information may tie or link a current transaction to one or more previously stored computer records. For example, within such records, a computer system may find the information necessary to identify and communicate with a computing device or account of a corresponding customer. Alternatively, or in addition thereto, such records may enable a computer system to tie or link a current transaction to an appropriate computing device or account.

A notification module 84 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt 62 is available for download).

A synchronization module 86 may support or enable one way or two way data communication between a computer system and a computing device. For example, a synchronization module 86 may support or enable the passing of receipt data 60 or updated receipt data 60 from a computer system to a computing device. A synchronization module 86 may also enable certain data received from a computing device to be incorporated within or used by a computer system. For example, one or more user preferences (e.g., notification preferences) may be communicated to a computer system from an application resident on a computing device.

The various functions or modules of a receipt module 78 may be enacted or implemented by any suitable system or component thereof. For example, in selected embodiments, one or more functions or modules of a receipt module 78 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 7:
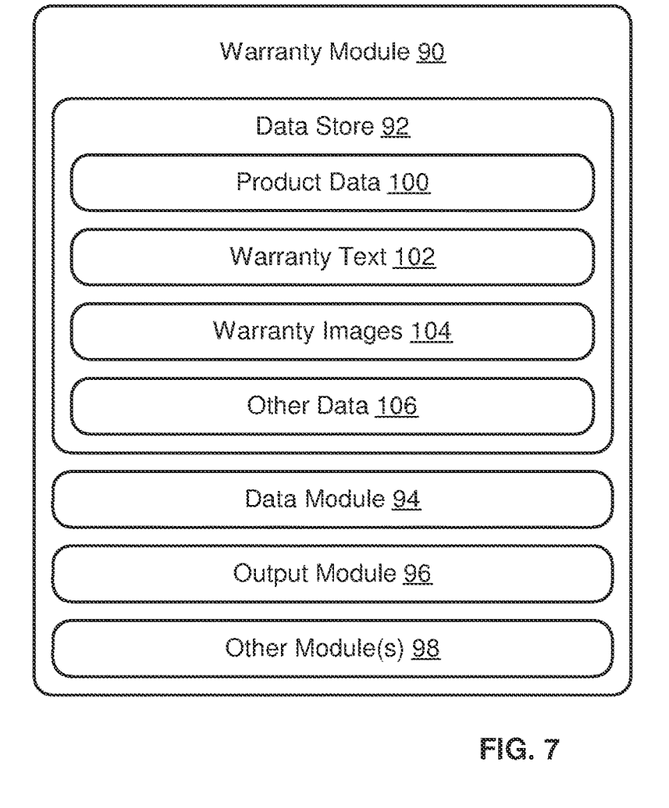
FIG. 7 is a schematic block diagram of one embodiment of a warranty module in accordance with the present invention.

Referring to FIG. 7, in selected embodiments, one or more computers, computers systems, mobile computing devices, or the like or a combination or sub-combination thereof may support or enable a warranty module 90. A warranty module 90 may use certain receipt data 60 as a vehicle for presenting warranty information (e.g., the terms 12 of one or more warranties 10) to one or more customers. A warranty module 90 may include any suitable arrangement of sub-components or modules. In certain embodiments, a warranty module 90 may include a data store 92, data module 94, output module 96, one or more other modules 98 as desired or necessary, or the like or a combination or sub-combination thereof.

A data store 92 may contain records supporting the operation of a warranty module 90. In selected embodiments, a data store 92 may contain or store product data 100, warranty text 102, one or more warranties images 104, some other data 106, or the like or a combination or sub-combination thereof. Product data 100 may provide a link between one or more products and one or more warranties 10 corresponding thereto. For example, product data 100 may indicate that a certain group of electronic products marketed by a particular manufacturer all fall within a particular manufacturer's warranty 10*a*.

In certain embodiments, product data 100 may link one or more products to one or more extended warranties 10*b* purchased from those products. For example, a retailer to which a computer system corresponds may offer one or more extended warranties 10*b*. Accordingly, when a customer purchases an extended warranty 10*b* from the retailer, product data 100 may be updated to reflect the purchase and identify the product or products to which the extended warranty 10b applies.

The terms 12 of one or more warranties 10 may be stored in a data store 92 in any suitable manner or format. In certain embodiments, the terms 12 of one or more warranties 10 may be stored in a data store 92 in the form of warranty text 102. Warranty text 102 may comprise one or more text-based computer files containing written recitations of the terms 12 of one or more warranties 10. In selected embodiments, all the text corresponding to each separate warranty 10 may be contained within separate computer files.

In certain embodiments, the terms 12 of one or more warranties 10 may be stored in a data store 92 in the form of warranty images 104. Warranty images 104 may comprise one or more image-based computer files. For example, warranty images 104 may comprise photographs or scanned images of sheets or cards having one or more terms 12 of a warranty 10 written thereon.

A data module 94 may perform certain processing or preprocessing functions with respect to selected contents of a data store 92. For example, in selected embodiments, a data module 94 may receive, collect, generate, format, communicate, and/or manage product data 100, warranty text 102, warranty images 104, or the like. For example, a data module 94 may analyze or use receipt data 60 in an effort to obtain, locate, or the like warranty information corresponding thereto.

In selected embodiments, a data module 94 may analyze or use receipt data 60 to locate corresponding warranty information contained in a data store 92. For example, a data module 94 may be programmed to apply one or more rules, filters, or the like to determine whether one or more products forming part of a point-of-sale transaction correspond to one or more warranties 10 documented within the records of a data store 92. Alternatively, or in addition thereto, a data module 94 may analyze or use receipt data 60 to obtain warranty information that has not yet been documented within the records of a data store 92. For example, a data module 94 may invite and/or motivate a customer to provide (e.g., photograph and upload) certain warranty information.

An output module 96 may support or enable the passing and/or presenting of warranty information to one or more customers. For example, an output module 96 may flag within receipt data 60 one or more products as having an available warranty 10 (e.g., a manufacturer's and/or extended warranty 10a, 10b documented within the records of a data store 92). An output module 96 may accomplish this in any suitable manner. In selected embodiments, an output module 96 may cooperate with a receipt module 78 to incorporate the appropriate flag or flags within the receipt data 60, serve the flagged receipt data 60 to an appropriate computing device or account, flag (e.g., update with one or more flags) certain receipt data 60 that has already been served to an appropriate computing device or account, or the like or a combination or sub-combination thereof.

Alternatively, or in addition thereto, an output module 96 may respond to requests to present one or more warranties 10. For example, when an application running on a computing device of a customer offers to display a warranty 10, the customer may accept the offer (e.g., select a "see warranty" button). Accordingly, the application may request a copy of the appropriate warranty 10. An output module 96 may then respond to the request by serving the appropriate warranty 10 from a data store 92 to the application.

The various functions or modules of a warranty module 90 may be enacted or implemented by any suitable system or component thereof. For example, in selected embodiments, one or more functions or modules of a warranty module 90 may be distributed across one or more hardware devices, including a primary computer 24 of a POS system 22, a local server 38, a supervisory server 48, some other onsite resource, a computing device, some other offsite resource, or the like or combinations or sub-combinations thereof. Thus, systems and methods in accordance with the present invention may be adapted to a wide variety of situations, including more rigid legacy systems.

Figure 8:
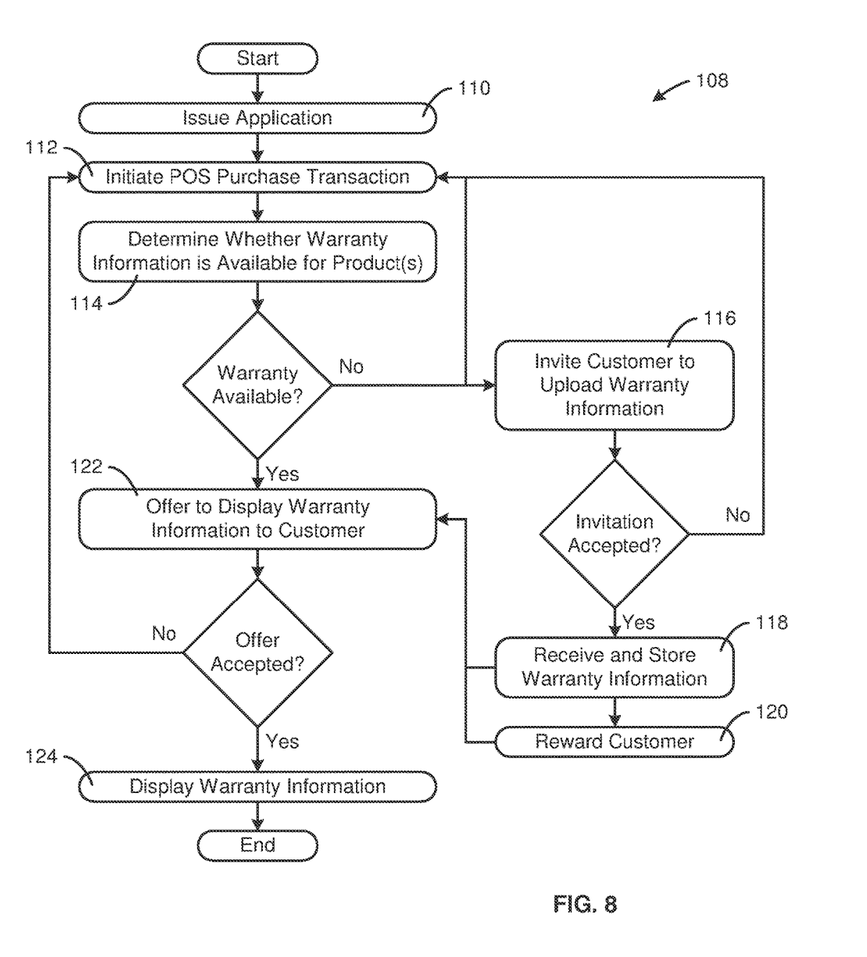
FIG. 8 is a block diagram of one embodiment of a method for storing and presenting warranty information to one or more customers in accordance with the present invention.

Referring to FIG. 8, one method 108 in accordance with the present invention may begin when an appropriate application (e.g., a retailer's mobile application, an electronic receipts application, or the like or a combination or sub-combination thereof) is issued 110 and installed on a computing device of a customer. In selected embodiments, a computer system may then enroll the customer in an electronic receipts program. In certain embodiments, this enrollment may result in the computing device (or an application installed thereon) being linked to or associated with certain identification information within the records of a computer system.

In other embodiments, the enrollment may be independent of any specific computing device. For example, in selected embodiments, enrollment may comprise the generation of an account. The customer may then access the account (e.g., "log into" the account) using a computing device. Accordingly, a customer may access the account via any one of several computing devices. Moreover, by "logging out" of an account, the corresponding computing device may be separated from the account.

So prepared, a customer may then enter a "brick-and-mortar" business location (e.g., enter a brick-and-mortar retail store with his or her computing device), select one or more items for purchase, and approach a POS system 22. At the POS system 22, a POS transaction (e.g., a purchase of one or more products) may be initiated 112.

During the transaction, a computer system may receive identification information. For example, a POS system 22 may scan a membership card, club card, loyalty card, identification card, credit card, debit card, or the like. From the scan, identification information (e.g., a unique identification number, membership number, or the like) may be obtained. Alternatively, while a cashier is processing a transaction, a customer may be prompted via a card reader 30b, customer-facing display 32a, or the like to enter (e.g., type in using the card reader 32b) an identification number (e.g., a mobile telephone number).

Identification information may be passed from a POS system 22 to one or more other computers (e.g., servers 38, 48) within a computer system. The identification information may link a customer and a corresponding transaction to one or more records stored within a computer system. In selected embodiments, such records may contain the information necessary to identify and communicate with a computing device or account of the corresponding customer. Accordingly, a computer system may deliver receipt data 60 documenting the transaction to an appropriate computing device or account.

At some point (e.g., during a transaction or sometime thereafter), a computer system may determine 114 whether any product forming part of the transaction corresponds to available warranty information (e.g., warranty information stored within a data store 92). If it is determined that no warranty information is available, then a corresponding method 108 may end or continue in the form of waiting for the next transaction. Alternatively, a determination that no warranty information is available may lead to an attempt to obtain the necessary warranty information.

Warranty information (e.g., warranty text 102, warranty images 104, or the like) may be obtained in any suitable manner. In selected embodiments, warranty information may be provided by one or more manufacturers. For example, one or more manufacturers may provide to an entity (e.g., retailer) supporting a computer system one or more text files comprising the written recitations of one or more warranties 10. The manufacturers may further identify (e.g., by stock-keeping unit (SKU) or the like) the products to which the one or more warranties 10 apply. Accordingly, an entity may rely on manufacturers as the source of warranty information.

Alternatively, or in addition thereto, an entity supporting a computer system may use its own resources to obtain warranty information. For example, a retailer may hire one or more workers to obtain and enter warranty information. This may be done as an in-house project. Alternatively, the work may be outsourced.

In still other embodiments or situations, an entity supporting a computer system may obtain warranty information via crowd sourcing. For example, when it is determined that no warranty information is available, a computer system may invite 116 one or more customers to provide the warranty information. This may be done in any suitable manner. For example, an invitation may be made in the context of an offered reward (e.g., "Scan in the warranty for this product and win 50 reward points").

In the invitation is not accepted, then a corresponding method 108 may end or continue in the form of waiting for the next transaction. Alternatively, should a customer accept the invitation and upload the warranty information (e.g., snap a photograph of a warranty sheet or card within the functionality of an appropriate "electronic receipts" application running on a computing device of a customer), a computer system may receive and store 118 the warranty information. If the invitation was made in the context of a reward, the customer may be rewarded 120 as promised.

Once it is determined 114 that one or more products forming part of the transaction correspond to available warranty information (e.g., warranty information stored within a data store 92) or appropriate warranty information is received 118 from a customer, a computer system may offer 122 to display warrant information to the customer. This may be accomplished in any suitable manner. In selected embodiments, an offer 122 may comprise displaying a "see warranty" button or the like proximate a corresponding product on a receipt 62 or receipt-related data.

In an offer 122 to display warranty information is not accepted, then a corresponding method 108 may end or continue in the form of waiting for the next transaction. Alternatively, if an offer 122 is accepted, a computer system may display 124 the appropriate warranty information. For example, a computer system may server 124 warranty text 102, one or more warranty images 104, or the like. Accordingly, the corresponding customer may analyze a warranty 10 to understand and/or act in accordance with the terms 12 thereof.

The flowchart in FIG. 8 illustrates the architecture, functionality, and operation of possible implementations of systems, methods, and computer program products according to certain embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for storing and presenting warranties to one or more customers, the method comprising:

initiating, by a sale computer comprising one or more sale processors and communicatively coupled to a network computer comprising one or more network processors, a transaction involving a purchase of at least one product purchased by a customer;

generating, by the sale computer, an electronic receipt documenting the transaction;

sending, by the sale computer, receipt data encoded on the electronic receipt to the network computer comprising non-displayed metadata not visible to the customer relating to one or more warranties available for the at least one product purchased by the customer, wherein the receipt data comprises one or more flags not visible to the customer to indicate the availability of the one or more warranties corresponding to the transaction, wherein:

a first flag corresponding to the at least one product and indicating that a warranty of the one or more warranties exists for the at least one product; and a second flag corresponding to the at least one product and indicating that an extended warranty of the one or more warranties exists for the at least one product;

determining, by the network computer, that warranty data regarding the one or more warranties corresponding to the at least one product is missing from the non-displayed metadata that is associated with the electronic receipt;

inviting the customer, by the network computer via an application installed on a customer computing device of the customer, to upload, via the customer computing device, the warranty data that is missing;

receiving, by the network computer via the application, a response to the inviting the customer to upload the warranty data that is missing, wherein the response includes the warranty data that is missing;

determining, by the network computer, that the warranty data that was missing has been provided by the customer;

requesting, by the network computer, two or more types of identification information from the customer, wherein the two or more types of identification information comprises a loyalty account and a biometric characteristic;

receiving, by the network computer via the application, the two or more types of identification information, as requested;

locating the loyalty account;

issuing a reward to the customer in exchange for uploading the warranty data that was missing, wherein the reward comprises issuing points to the loyalty account; and in response to determining that the warranty data that was missing has been provided by the customer:
updating, by the network computer, the electronic receipt with the warranty data provided by the customer;
delivering, by the network computer to the customer computing device via the application, the electronic receipt, as updated, including updated receipt data, wherein the updated receipt data includes non-displayed updated metadata with the warranty data not visible to the customer comprising at least one of:
the first flag is set corresponding to the at least one product and indicating that a warranty of the one or more warranties exists for the at least one product; or
the second flag is set corresponding to the at least one product and indicating that an extended warranty of the one or more warranties exists for the at least one product;
offering, by the network computer, to display the one or more warranties applicable to the at least one product on the customer computing device via the application;
receiving, by the network computer from the customer computing device, a request by the customer to display the one or more warranties via the application; and
presenting, by the network computer via the application, the one or more warranties to the customer on the customer computing device based on the updated metadata for the electronic receipt, as updated.

2. The method of claim 1, wherein the sale computer is contained within a brick-and-mortar store corresponding to a retailer.

3. The method of claim 1, wherein the warranty indicated by the first flag comprises a manufacturer's warranty issued by a manufacturer of the at least one product.

4. The method of claim 1, wherein the customer computing device comprises a mobile telephone.

5. The method of claim 1, wherein the receipt data further comprises an interface through which the one or more warranties are shown via the application.

6. The method of claim 1, wherein the biometric characteristic comprises a fingerprint.

7. The method of claim 1, wherein the inviting the customer to upload the warranty data that is missing further comprises locating corresponding warranty data from a data store via the application installed on the customer computing device.

8. The method of claim 1, wherein the application installed on the customer computing device enrolls the customer in an electronic receipts program associated with the identification information within records stored in the network computer.

9. The method of claim 1, further comprising:
transmitting, with the network computer, a notification to the application on the customer computing device with one or more push notifications that an updated electronic receipt is available for download.

10. The method of claim 1, wherein the reward is presented to the customer by the network computer via the application on the customer computing device.

11. A sales system comprising:
one or more computer processors; and
one or more non-transitory memory storage systems storing computing instructions configured to run on the one or more computer processors, the one or more non-transitory memory storage systems comprising:
a sale computer configured to:
initiate a transaction involving a purchase of at least one product purchased by a customer, and
generate an electronic receipt comprising receipt data documenting the transaction;
sending receipt data encoded on the electronic receipt to a network computer comprising non-displayed metadata not visible to the customer relating to one or more warranties available for the at least one product purchased by the customer, wherein the receipt data comprises one or more flags not visible to the customer to indicate the availability of the one or more warranties corresponding to the transaction, wherein:
a first flag corresponding to the at least one product and indicating that a warranty of the one or more warranties exists for the at least one product; and
a second flag corresponding to the at least one product and indicating that an extended warranty of the one or more warranties exists for the at least one product;
an application installed on a customer computing device; and
the network computer communicatively coupled to the sale computer, the network computer comprising:
one or more memory devices operably connected to the one or more processors, the one or more memory devices collectively storing:
a data module programmed to:
receive the electronic receipt from the sale computer;
analyze the transaction; and
determine that warranty data regarding the one or more warranties corresponding the at least one product is missing from the non-displayed metadata that is associated with the electronic receipt;
an output module programmed to:
invite the customer to upload the warranty data that is missing via the application on the customer computing device;
receive a response to the invitation to upload the warranty data that is missing, wherein the response includes the warranty data that is missing;
determine that the warranty that was missing data has been provided by the customer;
requesting two or more types of identification information from the customer, wherein the two or more types of identification information comprises a loyalty account and a biometric characteristic;
receiving the two or more types of identification information, as requested, and locating the loyalty account;

issuing a reward to the customer in exchange for uploading the warranty data that was missing, wherein the reward comprises issuing points to the loyalty account;

in response to determining that the warranty data that was missing has been provided by the customer:

update the electronic receipt with the warranty data provided by the customer;

deliver to the customer computing device via the application, the electronic receipt, as updated, including updated receipt data, wherein the updated receipt data includes non-displayed updated metadata with the warranty data not visible to the customer comprising at least one of:

the first flag is set corresponding to the at least one product and indicating that a warranty of the one or more warranties exists for the at least one product; or the second flag is set corresponding to the at least one product and indicating that an extended warranty of the one or more warranties exists for the at least one product;

offering to display the one or more warranties applicable to the at least one product on the customer computing device via the application;

receiving from the customer computing device, a request by the customer to display the one or more warranties via the application; and presenting via the application, the one or more warranties to the customer on the customer computing device based on the updated metadata for the electronic receipt, as updated.

12. The sales system of claim 11, wherein the reward is presented to the customer by the network computer via the application on the customer computing device.

13. The sales system of claim 11, wherein the receipt data further comprises an interface or vehicle through which the warranty data may be offered and/or obtained.

14. The sales system of claim 11, wherein the biometric characteristic comprises a fingerprint.

15. The sales system of claim 11, wherein the inviting the customer to upload the warranty data that is missing further comprises locating corresponding warranty data from a data store via the application installed on the customer computing device.

16. The sales system of claim 11, wherein the application installed on the customer computing device enrolls the customer in an electronic receipts program associated with the identification information within records stored in the network computer.

17. The sales system of claim 11, the one or more computer processors, the one or more non-transitory memory storage systems further comprise:

transmit a notification to the application on the customer computing device with one or more push notifications that an updated electronic receipt is available for download.

18. The sales system of claim 11, wherein the sale computer is contained within a brick-and-mortar store corresponding to a retailer.

19. The sales system of claim 11, wherein the customer computing device comprises a mobile telephone.

20. The sales system of claim 11, wherein the application running on the customer computing device further comprises creating a warranty button to display the one or more warranties available to the at least one product.

* * * * *